(12) United States Patent
Kuwamoto

(10) Patent No.: US 9,611,413 B2
(45) Date of Patent: Apr. 4, 2017

(54) RADIATOR ADDITIVE AND METHOD OF USE THEREOF

(71) Applicant: BIO EPOCH CO., LTD., Osaka-shi, Osaka (JP)

(72) Inventor: Isao Kuwamoto, Osaka (JP)

(73) Assignee: BIO EPOCH CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 14/897,482

(22) PCT Filed: Jun. 13, 2014

(86) PCT No.: PCT/JP2014/065779
§ 371 (c)(1),
(2) Date: Dec. 10, 2015

(87) PCT Pub. No.: WO2014/203831
PCT Pub. Date: Dec. 24, 2014

(65) Prior Publication Data
US 2016/0137899 A1    May 19, 2016

(30) Foreign Application Priority Data
Jun. 17, 2013 (JP) ................................. 2013-127048

(51) Int. Cl.
C09K 5/10    (2006.01)

(52) U.S. Cl.
CPC ...................... *C09K 5/10* (2013.01)

(58) Field of Classification Search
None
See application file for complete search history.

(56) References Cited

U.S. PATENT DOCUMENTS

2013/0119302 A1*  5/2013  Huang .................... C09K 5/14
                                                                   252/77

FOREIGN PATENT DOCUMENTS

| CN | 1596336 A | 3/2005 |
|----|-----------|--------|
| JP | H08-283704 A | 10/1996 |
| JP | 2615418 B2 | 5/1997 |
| JP | 2002-147294 A | 5/2002 |
| JP | 2003-161152 A | 6/2003 |
| JP | 3115182 U | 9/2005 |
| JP | 2007-162546 A | 6/2007 |
| JP | 2008-56592 A | 3/2008 |

(Continued)

OTHER PUBLICATIONS

PCT, "International Search Report for International Application No. PCT/JP2014/065779".

(Continued)

*Primary Examiner* — Necholus Ogden, Jr.
(74) *Attorney, Agent, or Firm* — Manabu Kanesaka

(57) ABSTRACT

A radiator additive which can significantly improve automobile fuel efficiency by adding only slightly to a coolant of a radiator is newly provided. The radiator additive according to the present invention is a radiator additive including a colloidal solution that includes platinum nanoparticles and/or gold nanoparticles having an average particle diameter of 1 to 10 nm, and can improve fuel efficiency of an internal combustion engine by adding to the coolant so as to constitute at least 1% of the volume of the coolant added into the radiator for cooling the internal combustion engine.

11 Claims, 2 Drawing Sheets

(56) References Cited

FOREIGN PATENT DOCUMENTS

| JP | 2009-2320 A | 1/2009 |
|---|---|---|
| JP | 2009-292896 A | 12/2009 |
| JP | 2010-541184 A | 12/2010 |
| JP | 2011-84234 A | 5/2011 |
| JP | 2013-028792 A | 2/2013 |
| JP | 2013-104059 A | 5/2013 |
| KR | 10-2004-0061003 A | 7/2004 |
| WO | 03/046343 A1 | 6/2003 |
| WO | 2007/069435 A1 | 6/2007 |
| WO | 2012/033975 A1 | 3/2012 |

OTHER PUBLICATIONS

Japan Patent Office, "Office Action for Japanese Patent Application No. 2015-522886," Dec. 1, 2016.

* cited by examiner

US 9,611,413 B2

RADIATOR ADDITIVE AND METHOD OF USE THEREOF

RELATED APPLICATIONS

The present application is National Phase of International Application No. PCT/JP2014/065779 filed Jun. 13, 2014, and claim priority from Japanese Application No. 2013-127048, filed Jun. 17, 2013, the disclosure of which is hereby incorporated by reference herein in its entirety.

FIELD OF TECHNOLOGY

The present invention relates to a radiator additive for improving fuel efficiency and a method of use thereof.

BACKGROUND ART

Conventionally, as for an internal combustion engine of an automobile and the like, various ideas have been devised to improve fuel efficiency thereof. For example, a fuel/air mixture was optimized for complete combustion by mixing an additive with fuel, or by coating an air filter with a coating agent so as to improve fuel efficiency.

Generally, a radiator is disposed near the internal combustion engine in order to cool the internal combustion engine and improve thermal efficiency; however, as for a coolant added into the radiator, various devices have been made to improve the fuel efficiency as well. For example, in Patent Document 1, fuel efficiency is improved without manipulating the internal combustion engine or an electrical system using the coolant containing an antifreeze solution, a microorganism co-cultivation extraction liquid, and the like. Also, in Patent Document 2, a liquid containing a powdered tourmaline is used as the coolant inside the radiator, so that the coolant having an electrical property is discharged into an outside of an engine cylinder, and a fuel mix gas inside the cylinder is ion-activated to promote the complete combustion of the fuel mix gas so as to improve horsepower and fuel efficiency.

Furthermore, in Patent Document 3, there is disclosed an additive for a radiator which improves the fuel efficiency of the internal combustion engine and reduces an environmental load by being added to the coolant inside the radiator. According to the Patent Document 3, the inside of an engine combustion chamber is negative-ionized by adding the additive for the radiator comprising a mixture of powders of carbon-based semiconductor material and anion ore, which have a particle diameter in micrometer units at the maximum, and ethylene glycol to the antifreeze solution so as to carry out the complete combustion of the fuel/air mixture, thereby improving fuel efficiency.

There are many unclear points regarding a process for improving fuel efficiency; however, unlike conventional additives or coating agents for gasoline or the air filter, an attempt to improve fuel efficiency of the internal combustion engine of the automobile and the like using the additive for the radiator such as the Patent Document 3 is expected as a new research and development field.

On the other hand, since platinum which is a noble metal is highly stable chemically, is hardly oxidized, and has a high melting point of 1769° C. (physics and chemistry dictionary), the platinum is used for various applications such as crucible, platinum loop, weights and measures standard (prototype kilogram, prototype meter), an electrode, or the like. For example, in a platinum electrode, since the platinum is chemically stable so as to have the advantage that it is resistant to chemical change occurring on an electrode surface or at an electrode periphery, the platinum electrode is widely used for various types of oxidation-reduction reaction, a reforming reaction, or the like, and it is known that it exhibits excellent activation as a catalyst as well compared to other metal catalysts.

As mentioned above, since the platinum has high activation as the catalyst, a large quantity of platinum is used for the automobile as an exhaust gas purification catalyst. Furthermore, due to high durability thereof, platinum is frequently used in parts exposed to harsh environments such as a spark plug, an exhaust air sensor, or the like of the automobile in the same manner.

On the other hand, recently, Patent Document 4 discloses a colloidal solution containing a nano-sized platinum particle, and combined with various platinum applications as mentioned above, a research development using a colloidal nano-sized platinum solution has received attention.

Also, recently, catalysis of a nano-sized gold particle has received attention, and for example, Patent Document 5 provides a technology of immobilizing gold fine particles on a carrier comprising a metallic oxide composed of mainly titanium, and using it as the catalyst in various types of applications. Moreover, Patent Document 6 introduces a method of manufacturing a gold fine particle having an average particle diameter of 3 nm or less by mixing a reducing agent solution with a gold ion solution (including a colloidal state).

Patent Document 1: Japanese Unexamined Patent Application Publication No. H08-283704

Patent Document 2: Japanese Unexamined Patent Application Publication No. 2003-161152

Patent Document 3: Japanese Unexamined Patent Application Publication No. 2007-162546.

Patent Document 4: Japanese Unexamined Patent Application Publication No. 2008-56592

Patent Document 5: Japanese Patent No. 2615418

Patent Document 6: Japanese Unexamined Patent Application Publication No. 2011-94234

SUMMARY OF THE INVENTION

Problems to be Solved by the Invention

In view of the perspective described above, as a result of diligent studies, inventors of the present invention have newly developed a radiator additive which can significantly improve fuel efficiency of the automobile only by slightly adding to the coolant of the radiator, and provide the radiator additive thereof.

Means for Solving the Problems

A radiator additive according to the present invention is a radiator additive comprising a colloidal solution including platinum nanoparticles having an average particle diameter of 1 to 10 nm (hereinafter, also referred to as a "colloidal platinum solution"), and is added to a coolant so as to constitute at least 1% of the volume of the coolant which is added into a radiator for cooling an internal combustion engine, thereby improving fuel efficiency of the internal combustion engine.

In the radiator additive according to the present invention, the colloidal platinum solution is prepared by reducing a platinum ion.

Also, the radiator additive according to the present invention is a radiator additive comprising a colloidal solution including gold nanoparticles having an average particle diameter of 1 to 10 nm (hereinafter, also referred to as a "colloidal gold solution"), and is added to the coolant so as to constitute at least 1% of the volume in the coolant which is added into the radiator for cooling the internal combustion engine, thereby improving the fuel efficiency of the internal combustion engine.

In the radiator additive according to the present invention, the colloidal gold solution is prepared by reducing a gold ion.

Also, the radiator additive according to the present invention is a radiator additive comprising a mixed solution of the colloidal platinum solution and the colloidal gold solution (hereinafter, also referred to as a "colloidal platinum-gold mixed solution"), and is added to the coolant so as to constitute at least 1% of the volume in the coolant which is added into the radiator for cooling the internal combustion engine, thereby improving the fuel efficiency of the internal combustion engine.

In the radiator additive comprising the colloidal platinum-gold mixed solution according to the present invention, the volume of the colloidal gold solution is preferably 5% to 50% of the volume of the radiator additive.

In the radiator additive according to the present invention, the internal combustion engine may be an engine for an ordinary automobile using gasoline as fuel.

Also, in the radiator additive according to the present invention, the internal combustion engine may be a diesel engine for an automobile using light oil as fuel.

A method of using the radiator additive according to the present invention is a method of using the radiator additive comprising the colloidal platinum solution, and includes a step of preparing the coolant which is added into the radiator for cooling the internal combustion engine, and a step of manufacturing a mixed coolant by mixing the radiator additive with the coolant so that a concentration of the radiator additive is at least 1% of the volume in the coolant after the radiator additive is mixed.

Also, a method of using the radiator additive according to the present invention is a method of using the radiator additive comprising the colloidal gold solution, and includes the step of preparing the coolant which is added into the radiator for cooling the internal combustion engine, and the step of manufacturing the mixed coolant by mixing the radiator additive with the coolant so that the concentration of the radiator additive constitutes at least 1% of the volume in the coolant after the radiator additive is mixed.

Also, a method of using the radiator additive according to the present invention is a method of using the radiator additive comprising the colloidal platinum-gold mixed solution, and includes the step of preparing the coolant which is added into the radiator for cooling the internal combustion engine, and the step of manufacturing the mixed coolant by mixing the radiator additive with the coolant so that the concentration of the radiator additive is at least 1% of the volume in the coolant after the radiator additive is mixed.

The method of using the radiator additive according to the present invention may include a step of adding the mixed coolant into the radiator.

Effect of the Invention

In the radiator additive according to the present invention, nano-sized platinum particles and/or nano-sized gold particles are dispersed in the coolant of the radiator, thereby improving a cooling performance of the internal combustion engine.

Compared to a case wherein the radiator additive according to the present invention is not added, the fuel efficiency can be improved by 10% and more only by slightly adding the radiator additive according to the present invention with approximately 1% of the volume of the coolant which is added into the radiator, and the fuel efficiency can be improved very efficiently at low cost.

Especially, in a case wherein the internal combustion engine is the engine for the ordinary automobile using gasoline as fuel, when 100% of the colloidal platinum solution was used as the radiator additive, the improvement of the cooling performance of the internal combustion engine was significant.

Also, in a case wherein the internal combustion engine is the diesel engine for the automobile using light oil as fuel, in the colloidal platinum-gold mixed solution as the radiator additive, the volume of the colloidal gold solution is preferably 5% to 50% of the volume of the colloidal platinum-gold mixed solution. Furthermore, the volume of the colloidal gold solution is more preferably 15% to 35% of the colloidal platinum-gold mixed solution, and the volume of the colloidal gold solution is most optimally 20% of the volume of the colloidal platinum-gold mixed solution, so that the improvement of the cooling performance of the internal combustion engine was significant.

The radiator additive according to the present invention provides an effect only by replacing 1% of the coolant added into the radiator with the radiator additive of the present invention, and can be easily added to the coolant of the automobile currently used as well.

BEST MODES OF CARRYING OUT THE INVENTION

Hereinafter, with reference to the drawings, embodiments of a radiator additive according to the present invention will be explained. Incidentally, in each drawing, the same reference symbols are used for the same components.

Figure 1:
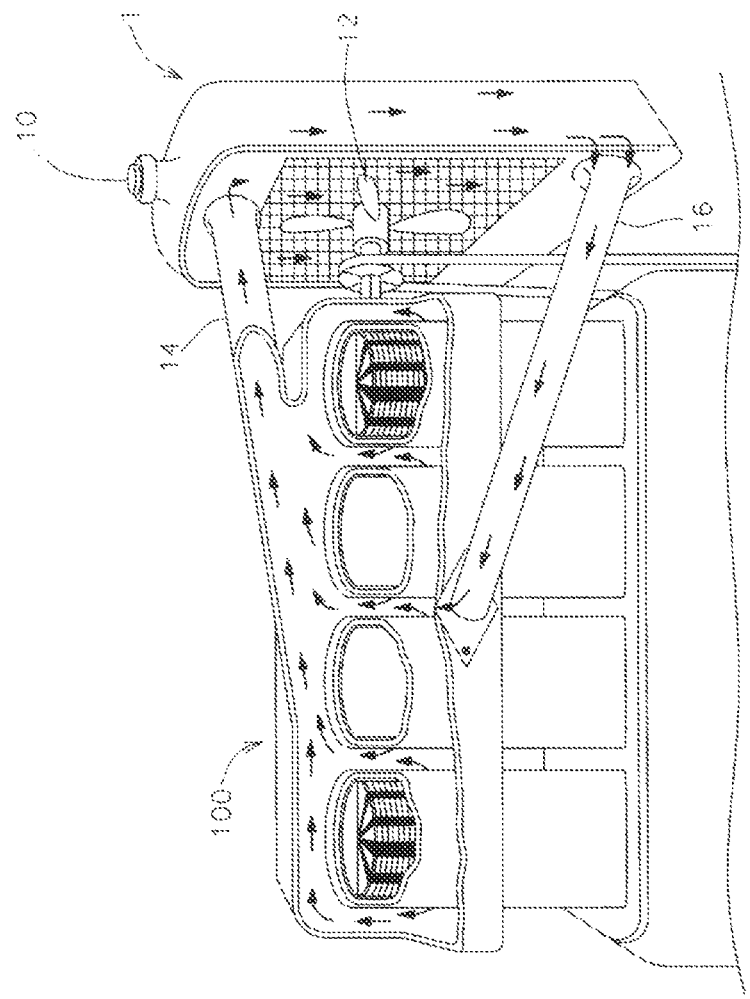
FIG. 1 is a perspective view of a radiator and an internal combustion engine.

The radiator additive according to the present invention is a radiator additive comprising a colloidal platinum solution, and improves fuel efficiency of a vehicle where an internal combustion engine 100 is mounted, for example, by adding to a coolant so as to constitute at least 1% of the volume in the coolant which is added into a radiator 1 for cooling the internal combustion engine 100 in FIG. 1.

In FIG. 1, the aforementioned vehicle may be an automobile, and the radiator 1 and the internal combustion engine (an engine) 100 are connected by an upper hose 14 and a lower hose 16, and the coolant where the radiator additive according to the present invention is added is circulated from the radiator 1 to the lower hose 16, to the engine 100, to the upper hose 14, and to the radiator 1 so as to cool the engine 100.

The aforementioned colloidal platinum solution has a characteristic of being prepared by reducing a platinum ion. As for the radiator additive according to the present invention, for example, there is a radiator additive comprising the colloidal solution including platinum nanoparticles having an average particle diameter of 1 to 10 nm. Such a colloidal solution can be prepared by reducing the platinum ion, such as a platinum chloride ion ($PtCl_4^{2-}$), by a reducing agent having a reducing capacity relative to the platinum ion, such as an ascorbic acid, and the like, in water. A concentration of the platinum ion (the platinum chloride ion) in water for preparing the colloidal solution is preferably 0.001 to 0.1 mol/L, and a concentration of the reducing agent is preferably 5 to 20 times more than the concentration of the platinum ion. Incidentally, in order to stably hold the platinum ion in water, it is preferable to add hydroxycarboxylic acid (which may be in the form of a salt such as sodium salt and the like) such as citric acid and the like as a stabilizer. A concentration of the stabilizer in water is preferable to be 0.5 to 2 times more than the concentration of the platinum ion.

Also, the radiator additive according to the present invention may be a radiator additive comprising a colloidal gold solution. For example, the radiator additive improves the fuel efficiency of the vehicle where the internal combustion engine 100 is mounted by adding to the coolant so as to constitute at least 1% of the volume in the coolant added into the radiator 1 for cooling the internal combustion engine 100 in FIG. 1.

The aforementioned colloidal gold solution has a characteristic of being prepared by reducing a gold ion. As for the radiator additive according to the present invention, for example, there is a radiator additive comprising colloidal solution including gold nanoparticles having an average particle diameter of 1 to 10 nm. Such a colloidal solution can be prepared by reducing the gold ion, such as a chlorauric acid ion ($AuCl_4^-$), by a reducing agent having a reducing capacity relative to the gold ion, in water.

Also, the radiator additive according to the present invention may be the radiator additive comprising a colloidal platinum-gold mixed solution. For example, the radiator additive improves the fuel efficiency of the vehicle where the internal combustion engine 100 is mounted by adding to the coolant so as to constitute at least 1% of the volume in the coolant added into the radiator 1 for cooling the internal combustion engine 100 in FIG. 1. In that case, in the aforementioned colloidal platinum-gold mixed solution, a volume of the colloidal gold solution is preferable to be 5% to 50% of a volume of the colloidal platinum-gold mixed solution. Furthermore, the volume of the colloidal gold solution is more preferable to be 15% to 35%, and the volume of the colloidal gold solution is the most optimal to be 20% of the colloidal platinum-gold mixed solution.

There are several possible reasons that the coolant to which the radiator additive according to the present invention is added improves the fuel efficiency of the internal combustion engine 100; however, it can be considered that since a specific heat of the platinum nanoparticles (and/or gold nanoparticles) contained in the radiator additive according to the present invention is low, circulation efficiency of heat generated from the internal combustion engine 100 increases so as to improve a cooling capacity of the radiator 1. Alternatively, it can be also considered to have an effect in improving an environment wherein a fuel burns in the internal combustion engine 100 since a metallic ion generated from the internal combustion engine 100 is neutralized by high catalysis of the platinum nanoparticles (and/or the gold nanoparticles). A scientific study is left to future research.

Next, a method of using the radiator additive according to the present invention will be explained.

The method of using the radiator additive according to the present invention is a method of using the radiator additive comprising the colloidal platinum solution, the colloidal gold solution, or the colloidal platinum-gold mixed solution, and includes a step of preparing the coolant added into the radiator for cooling the internal combustion engine, and a step of manufacturing a mixed coolant by mixing the radiator additive with the coolant so that a concentration of the radiator additive constitutes at least 1% of the volume in the coolant after the radiator additive is mixed.

The method of using the radiator additive according to the present invention may include a step of adding the mixed coolant into the radiator.

Therefore, the radiator additive according to the present invention can significantly improve the fuel efficiency of the automobile only by, for example, taking out 1% of the coolant from a cap 10 of the radiator 1 of the automobile, and supplementing a taken-out portion thereof with the radiator additive of the present invention. Obviously, the radiator additive according to the present invention may be added into the radiator 1 from the cap 10 by mixing the radiator additive according to the present invention beforehand with the coolant before being added into the radiator 1 so that the concentration of the radiator additive constitutes at least 1%.

Hereinafter, the present invention will be explained further in detail with examples; however, the present invention is not interpreted as being limited to the following description at all.

Example 1

The radiator additive (the colloidal platinum solution) of the present invention was manufactured in the following manner.

(Process) Preparation of Radiator Additive

A potassium chloroplatinate solution of 0.01 mol/L (0.050 g/L as Pt (0)) was prepared by dissolving potassium chloroplatinate ($K_2PtCl_4$) of 0.208 g in pure water of 50 mL. Also, separately, a sodium citrate solution of 0.01 mol/L (0.066 g/mL) was prepared by dissolving sodium citrate of 0.129 g in pure water of 50 mL, and an ascorbic acid solution of 0.1 mol/L (0.452 g/L) was prepared by dissolving ascorbic acid of 0.881 g in pure water of 50 mL, respectively. The aforementioned 50 mL of potassium chloroplatinate solution of 0.01 mol/L was added to pure water of 1800 mL, and then, additionally, the 50 mL of sodium citrate solution of 0.01 mol/L and the 50 mL of ascorbic acid solution of 0.1 mol/L were added respectively, and were strongly stirred approximately for five minutes so as to obtain a colloidal solution including platinum nanoparticles having an average particle diameter of 4 nm as the radiator additive (the average particle diameter was measured by a field-emission-type scanning electron microscope measurement which was carried out by dispersing and drying/hardening the solution.)

Example 2

The aforementioned vehicle may be an ordinary automobile using gasoline as the fuel. Inventors of the present invention added 1% of the radiator additive (the colloidal platinum solution) according to the present invention to a radiator coolant of a Toyota Crown Wagon having average fuel efficiency of 8.5 km/L, and measured fuel efficiency of the aforementioned passenger vehicle from Jul. 6 to Dec. 12 in 2011 as shown in the following Table 1.

TABLE 1

| Refueling Date | Mileage (km) | Refueling Quantity (L) | Fuel Efficiency (km/L) |
| --- | --- | --- | --- |
| 2011 Jul. 6 | 268 | 31.4 | 8.5 |
| 2011 Jul. 13 | 462 | 47.1 | 9.8 |
| 2011 Jul. 19 | 389 | 36.5 | 10.7 |
| 2011 Jul. 27 | 416 | 41.6 | 10.0 |
| 2011 Aug. 5 | 423 | 46.6 | 9.1 |
| 2011 Aug. 17 | 374 | 42.2 | 8.9 |
| 2011 Aug. 25 | 357 | 34.3 | 10.4 |
| 2011 Aug. 31 | 421.6 | 40.8 | 10.3 |
| 2011 Sep. 17 | 377.5 | 40.9 | 9.2 |
| 2011 Sep. 22 | 365.9 | 37.3 | 9.8 |
| 2011 Sep. 26 | 381.5 | 34.5 | 11.1 |
| 2011 Oct. 5 | 328.4 | 35.7 | 9.2 |
| 2011 Oct. 15 | 458.3 | 44.1 | 10.4 |
| 2011 Oct. 18 | 218.6 | 20.7 | 10.6 |
| 2011 Oct. 31 | 635.3 | 61.1 | 10.4 |
| 2011 Nov. 5 | 419.6 | 37.1 | 11.3 |
| 2011 Nov. 7 | 169 | 17.2 | 9.8 |
| 2011 Nov. 15 | 318.6 | 31 | 10.3 |
| 2011 Nov. 24 | 393.1 | 40.8 | 9.6 |
| 2011 Dec. 4 | 359.6 | 37.7 | 9.5 |
| 2011 Dec. 7 | 169 | 17.2 | 9.8 |
| 2011 Dec. 12 | 445.9 | 42.8 | 10.4 |
| Total | 8150.9 | 818.6 | 10.0 |

Figure 2:
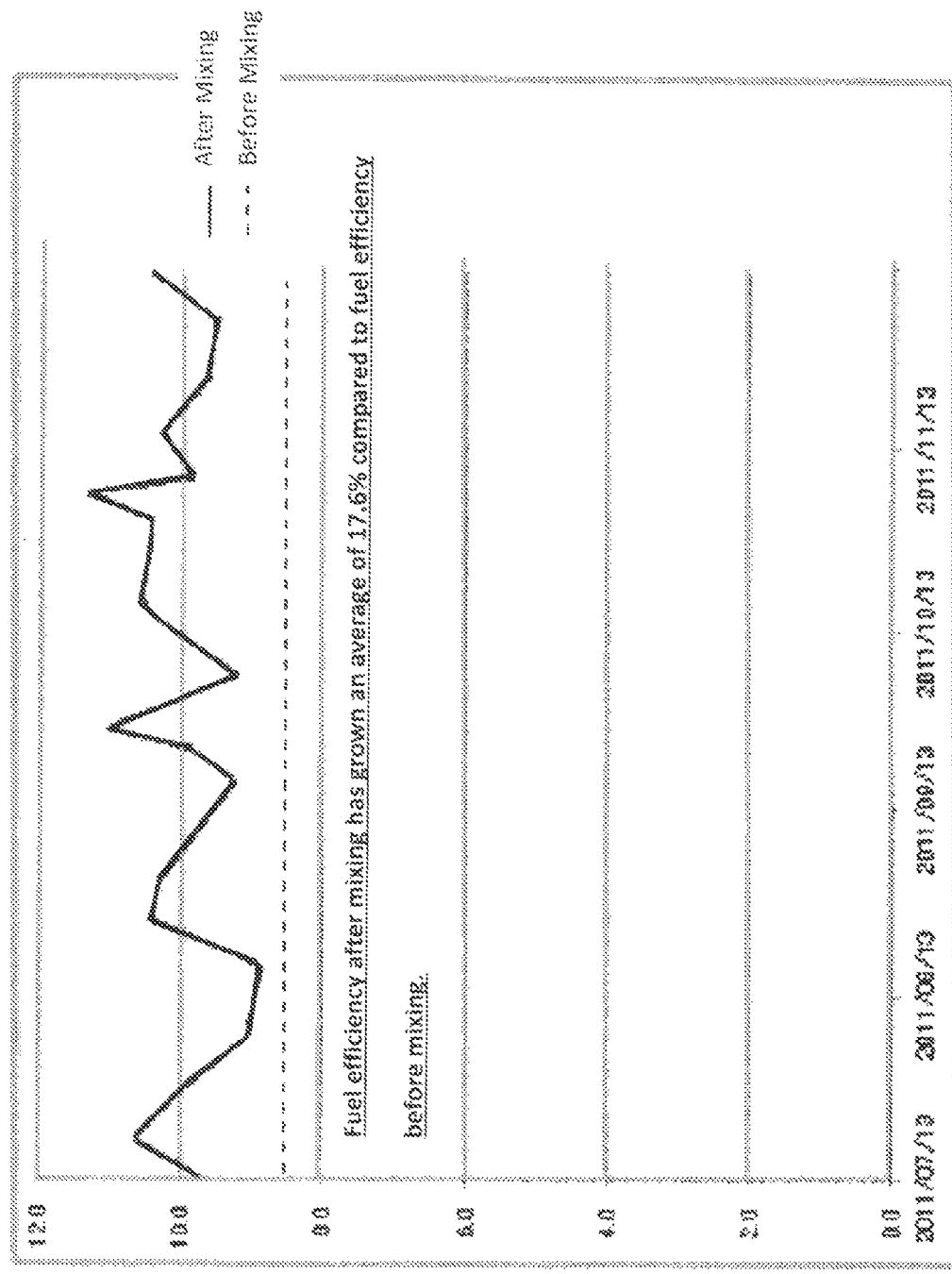
FIG. 2 is a graph showing a transition of fuel efficiency of gasoline vehicles before and after mixing a radiator additive according to the present invention.

Results of the aforementioned Table 1 are shown as a graph in FIG. 2. As shown above, before the radiator additive (the colloidal platinum solution) according to the present invention was added to the coolant, the average fuel efficiency of the passenger vehicle was 8.5 km/L; however, for five months while the coolant to which the radiator additive according to the present invention was added was used, the average fuel efficiency was never lower than 8.5 km/L, even once, which was the average fuel efficiency before the radiator additive according to the present invention was added. The average fuel efficiency after the radiator additive according to the present invention was added was 10.0 km/L so as to improve an average of 17.6% more than the average fuel efficiency before the radiator additive according to the present invention was added.

Example 3

The aforementioned passenger vehicle may be an automobile using light oil as the fuel. Inventors of the present invention added either the colloidal platinum solution, the colloidal gold solution, or the colloidal platinum-gold mixed solution according to the present invention to radiator coolants of four Nissan diesel dump trucks, and measured fuel efficiency of the aforementioned dump trucks from Jan. 6 to Feb. 28 in 2014 as shown in the following Table 2 (by usual working driving).

TABLE 2

| | | Dump Truck A | Dump Truck B | Dump Truck C | Dump Truck D |
| --- | --- | --- | --- | --- | --- |
| Before Experiment | Fuel Efficiency (km/L) | 2.77 | 2.81 | 2.82 | 2.70 |
| Experiment (1) | Fuel Efficiency (km/L) | 2.85 | 3.12 | 3.13 | 2.81 |
| | Percent | 103% | 111% | 111% | 104% |
| Experiment (2) | Fuel Efficiency (km/L) | 2.40 | 2.80 | 2.69 | 2.76 |
| | Percent | 87% | 100% | 95% | 102% |

[Table 2] Regarding Data Before Experiment

First, in order to calculate standard fuel efficiency, a usual coolant (LLC) was added into the radiators of the respective dump trucks (A to D) to measure the fuel efficiency.

This time, as for the radiator additive, the colloidal gold solution, the colloidal platinum solution (type 1), and the colloidal platinum solution (type 2) were prepared. The colloidal platinum solution (type 2) was prepared so that a platinum concentration becomes twice the platinum concentration of the colloidal platinum solution (type 1) shown in the [Example 1].

[Table 2] Regarding Data of Experiment (1)

Next, a coolant (LLC) to which 1% of the radiator additive according to the present invention was added was added into the radiators of the respective dump trucks (A to D) to measure the fuel efficiency in a period between Jan. 6 and Jan. 31 in 2014.

For the dump truck A, there is used 100% of the colloidal gold solution; for the dump truck B, there is used the colloidal platinum-gold mixed solution having 80% of the platinum (type 1) and 20% of the gold; for the dump truck C, there is used the colloidal platinum-gold mixed solution having 80% of the platinum (type 2) and 20% of the gold; and for the dump truck D, there is used 100% of the colloidal platinum solution (type 1), respectively.

[Table 2] Regarding Data of Experiment (2)

Furthermore, a coolant (LLC) to which 2% of the radiator additive according to the present invention was added was added into the radiators of the respective dump trucks (A to D) to measure the fuel efficiency in a period between Feb. 1 and Feb. 28 in 2014. However, combinations of the radiator additive used for the respective dump trucks are the same as those in Experiment (1).

When results of the aforementioned Table 2 were studied, a good result was obtained in any combination case at a time when 1% of the radiator additive was added more than that at a time when 2% of the radiator additive was added. Also, as for the radiator additive, when the colloidal platinum-gold mixed solution (1%) having 80% of platinum (type 1 and type 2) and 20% of gold was used, the best value in the present Experiments was obtained, wherein an improvement of 11% more than the average fuel efficiency before the radiator additive was added.

Hereinbefore, the radiator additive, the method of manufacturing thereof, and the method of using thereof have been explained. Those have been explained using the embodiments and examples as described above; however, the radiator additive according to the present invention is not limited to the aforementioned embodiments and the like.

Incidentally, the present invention can be carried out with various improvements, modifications, and changes based on knowledge of a person skilled in the art within the scope of the subject of the present invention.

INDUSTRIAL APPLICABILITY

The radiator additive according to the present invention can be used as the additive added to the coolant put into the radiator for cooling the internal combustion engine.

EXPLANATION OF SYMBOLS

1: a radiator
10: a cap
12: a fan
14: an upper hose
16: a lower hose
100: an internal combustion engine (an engine)

What is claimed is:

1. A radiator additive, comprising:
a colloidal platinum-gold mixed solution including a platinum colloidal solution having platinum nanoparticles with an average particle diameter of 1 to 10 nm, and a gold colloidal solution having gold nanoparticles with an average particle diameter of 1 to 10 nm, which are mixed together,
wherein the radiator additive is added to a coolant so as to constitute at least 1% of a volume in the coolant which is added to a radiator for cooling an internal combustion engine, thereby improving fuel efficiency of the internal combustion engine.

2. A radiator additive according to claim 1, wherein the colloidal gold solution is a reduced gold ion.

3. A radiator additive according to claim 1, wherein the colloidal platinum solution is a reduced platinum ion.

4. A radiator additive according to claim 1, wherein a volume of the colloidal gold solution is 5% to 50% of a volume of the colloidal platinum-gold mixed solution.

5. A radiator additive according to claim 1, wherein a volume of the colloidal gold solution is 15% to 35% of a volume of the colloidal platinum-gold mixed solution.

6. A radiator additive according to claim 1, wherein a volume of the colloidal gold solution is 20% of a volume of the colloidal platinum-gold mixed solution.

7. A method of using a radiator additive comprising:
a step of preparing a colloidal platinum-gold mixed solution wherein a colloidal platinum solution including platinum nanoparticles having an average particle diameter of 1 to 10 nm, and a colloidal gold solution including gold nanoparticles having an average particle diameter of 1 to 10 nm, are mixed,
a step of preparing a coolant added into a radiator for cooling an internal combustion engine, and
a step of preparing a mixed coolant by mixing the radiator additive with the coolant so that a concentration of the radiator additive is at least 1% of a volume of the coolant after the radiator additive is mixed.

8. A method of using the radiator additive according to claim 7, wherein the step of preparing the radiator additive includes a step of mixing with the colloidal platinum solution so that a volume of the colloidal gold solution is 5% to 50% of a volume of the colloidal platinum-gold mixed solution.

9. A method of using the radiator additive according to claim 7, wherein the step of preparing the radiator additive includes a step of mixing with the colloidal platinum solution so that a volume of the colloidal gold solution is 15% to 35% of a volume of the colloidal platinum-gold mixed solution.

10. A method of using the radiator additive according to claim 7, wherein the step of preparing the radiator additive includes a step of mixing with the colloidal platinum solution so that a volume of the colloidal gold solution is 20% of a volume of the colloidal platinum-gold mixed solution.

11. A method of using the radiator additive according to claim 7, further comprising a step of adding the mixed coolant into a radiator.

* * * * *